United States Patent Office 2,838,526
Patented June 10, 1958

2,838,526

HYDROGENATION OF STEROID COMPOUNDS

Gerald D. Laubach, Jackson Heights, N. Y., assignor to Chas. Pfizer & Co., Inc., Brooklyn, N. Y., a corporation of Delaware No Drawing. Application May 22, 1953
Serial No. 356,903

6 Claims. (Cl. 260—397.2)

This invention is concerned with a method for the synthesizing of steroid compounds. In particular, it is concerned with a method for the synthesis of such biologically active substances as compound F.

A number of elaborate and multi-step syntheses of such biologically active materials as cortisone and compound F (dihydrocortisone or 17-hydroxycorticosterone) have been developed. Many of these involve the use of unusual chemical reagents and starting materials which are difficult and costly to obtain.

It has now been found that a compound which may readily be obtained from the naturally occurring sterol, ergosterol, serves as an excellent intermediate for the preparation of a key intermediate known to be useful in the preparation of compound F. The new process and the novel intermediate compounds are described in detail below.

The starting material for the novel process of this invention is isoergosterone (also known as Δ-4,6,22-ergostatriene-3-one). A method for the preparation of this material in good yield from ergosterol is reported in Berichte, vol. 70, p. 1665 (1937), by Wetter and Dimroth. It has now been found that isoergosterone may be converted by contacting said compound with hydrogen in the presence of a noble metal catalyst and a basic material to the known compound coproergost-22-en-3-one in high yield. This material has been made previously by other much less useful processes. The present process is particularly valuable since practically none of the ring saturated compound with the undesired 5-α-configuration is formed. Furthermore, there is no reduction of the $C_{22}$–$C_{23}$ double bond, the retention of which is essential for the facile removal of the side chain.

Treatment of coproergost-22-en-3-one with a reducing agent capable of converting a nuclear steroid 3-ketone to the corresponding alcohol results in the formation of coproergost-22-en-3-ol. Among the agents which may be used for this purpose are hydrogen with Raney nickel catalyst, an alkali metal such as sodium with a lower aliphatic alcohol, lithium aluminum hydride, sodium borohydride and other chemical reducing agents of this nature. The latter two specified agents are particularly useful since they form practically none of the 3-β-ol whereas with the use of Raney nickel and hydrogen, some of this compound may be formed. The secondary alcohol group at the 3-position of the resulting compound may be protected from further reactions by conversion to an ester or an ether, for instance by treatment with an acylating agent. The coproergost-22-en-ol and the corresponding ethers and esters are known products. However, they never have been made before now by the present, highly useful method.

The protected alcohols prepared according to the method described above may be treated with certain agents to form the corresponding ester or ether of 3-hydroxybisnorcholane aldehyde. Particularly useful for conducting this conversion is ozone. The ozonide which is formed is treated with an hydrolytic agent under reductive conditions; for example with zinc metal and dilute mineral or acetic acid. 3-hydroxybisnorcholane aldehyde and its ethers and esters are novel and useful compounds.

Treatment of 3-hydroxybisnorcholane aldehyde or an ether or ester thereof with a strong acylating agent results in the formation of the enol ester of the aldehyde. If the 3-hydroxy group of the aldehyde compound is not protected by an ester or ether group, it will be converted during this reaction to the same ester as is the aldehyde group. Thus, if acetic anhydride, which may be used with pyridine is used to treat 3-hydroxybisnorcholane aldehyde, there is formed the anol acetate of 3-acetoxybisnorcholane aldehyde. The enol esters of 3-hydroxybisnorcholane aldehyde and its 3-ethers and 3-esters are new and highly useful products.

By treatment of a 3-ester or 3-ether of an enol ester formed according to the above description with ozone or other suitable oxidizing agent, there is formed the corresponding 3-ether or 3-ester of pregna-3-ol-20-one. This compound, prepared by the present novel process, is a known material and has been converted by a published method to compound S. The process for this conversion has been reported by Gallagher et al., in the Journal of the American Chemical Society, vol. 73, p. 184 (1951). Thus, it is possible to convert ergosterol, a relatively cheap and widely available mycosterol through certain known steps and by use of the novel processes and products described above to the very valuable antirheumatic compound F. The steps for this synthesis are outlined in the following chart.

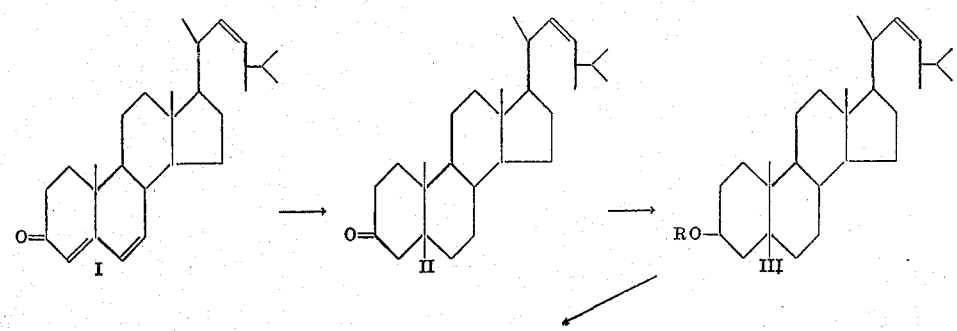

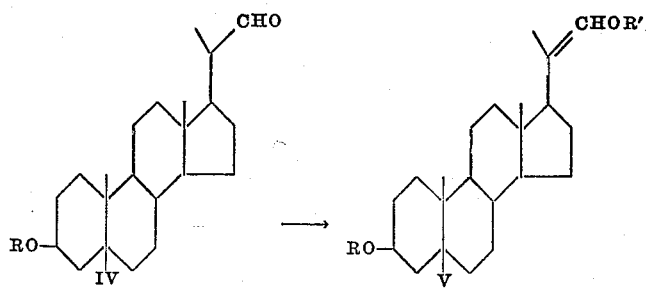
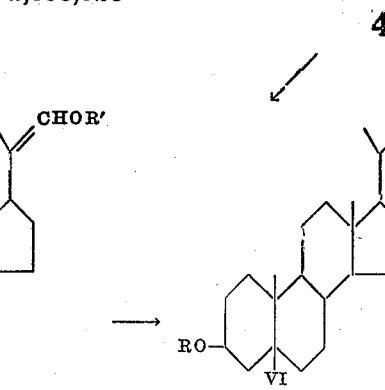

R=H, alkyl or acyl; R'=acyl.

Among the other esters that are useful (that is, as R or R' groups in the above diagram) are various aliphatic acyl groups, such as the propionate, butyrate, valerate, caproate, caprylate, succinate, isovalerate, and so forth. In addition, various aromatic ester groups may be used, such as the benzoate, ortho-, meta-, and para-methylbenzoate, halogenated benzoates, phthalate, naphthoate, and various aryl aliphatic ester groups and cycloalkyl aliphatic ester groups such as phenyl acetate, phenyl propionate, naphthoyl acetate, phenyl valerate, cyclohexyl acetate, cyclopentyl propionate, etc. Various ethers may be used as protective groups at the 3-position of the nucleus, that is, as R in the diagram above. These include the methyl, ethyl, propyl, benzyl, phenylethyl, phenylpropyl, cyclohexylmethyl, cyclohexylethyl, methoxymethyl and so forth.

In the above chart, compound I is isoergosterone. The reduction of this product to compound II, coproergost-22-en-3-one, may be accomplished most readily by agitation of an organic solvent solution of isoergosterone containing a noble metal catalyst and a basic substance in the presence of hydrogen. Palladium is particularly effective for this process. It may be used in various forms, such as palladium-on-charcoal, palladium-on-barium carbonate, palladium-on-alumina or the finely divided metal itself. Various organic solvents may be utilized for the process as long as they are not reactive with the compounds. Lower alcohols, such as ethanol, methanol and isopropanol, are quite useful. A compound which absorbs hydrogen obviously cannot be used. As the alkaline material to be included in the reaction mixture, alkali metal hydroxides are most useful. These include such substances as sodium hydroxide, potassium hydroxide, lithium hydroxide, etc. The alkaline material should be present in from about 10 to 100% by weight of the steroid compound. However, the proportion is not particularly critical. The product may be recovered by filtering the catalyst and removing the solvent under vacuum. If the residual material is then dissolved in a water-immiscible organic solvent, such as diethyl ether or a chlorinated hydrocarbon, the alkaline material may be extracted with a dilute aqueous acid, such as dilute hydrochloric acid. Traces of the residual acid may be removed by dilute mild alkali such as sodium bicarbonate and the solution may then be washed with water. The product of the reaction may be recovered from the water-immiscible solvent by evaporation. Unexpectedly high yields averaging 90% or more may be prepared in this manner. Practically no hydrogenation occurs at the 3-keto group or at the 22,23-double bond and, furthermore, the highly desirable A:B-ring juncture in the cis configuration is obtained. No appreciable amount of the trans configuration product is formed. This is of great importance in carrying out the further steps of the synthesis. In general, the reaction, when operated on a small scale, is completed within a few hours. The reaction either ceases completely or greatly decreases in rate after the theoretical two moles of hydrogen have been absorbed.

As noted above, the conversion of coproergost-22-en-3-one (II) to coproergosten-3-ol may be accomplished by means of a variety of reducing agents. Among the more useful of these is sodium borohydride which can be used to treat compound II above in an organic solvent such as a lower alcohol. The reaction is generally completed within a few hours and may be conducted at room temperature. Moderate heat is not deleterious but may hasten the completion of the reaction. Upon completion of the reaction, excess reagent may be destroyed with an acid such as acetic acid and the solvent used may be removed by evaporation. The product may be purified, if desired, by dissolving it in a water-immiscible solvent and washing the solution with water to remove traces of inorganic salts. By evaporation of the solvent, e. g. ether, chlorinated hydrocarbons, etc., the product is obtained in solid form. Since it is advisable to use an ester or an ether of the sterol in the next reaction, the crude coproergosten-3-ol may be acylated or etherified in crude form and the ester or ether may be isolated. Particularly useful is acetic anhydride which converts the alcohol to the 3-acetate. The acetic anhydride may be used with pyridine if desired. Other acylating agents such as benzoyl chloride, propionyl chloride, butyryl bromide, phenylacetyl chloride, p-methylbenzoyl chloride, phenylpropionyl chloride, cyclohexylacetyl chloride, cyclohexylpropionyl chloride, propionic anhydride, butyric anhydride, phthaloyl chloride, etc. may be used. Etherifying agents such as benzyl chloride, methyl sulfate, ethyl sulfate, propyl iodide, butyl bromide, cyclohexylmethyl bromide, phenylethyl chloride, phenylpropyl bromide, phenyl butyl iodide, cyclohexylethyl bromide, and other reagents of this nature may be utilized in the presence of a basic material such as an alkali metal hydroxide or an alkali metal alkoxide to convert the 3-ol group to the corresponding ether. This product may then be isolated in solid crystalline form.

Rather than utilizing a chemical reducing agent to convert the 3-keto group of compound II to the 3-ol group of compound III, this may be accomplished by catalytic reduction utilizing Raney nickel catalyst. The crude II may be used for this purpose. Hydrogenation may be accomplished with a solvent solution of II. The lower alcohols are particularly suitable for this reaction. However, ethers such as diethyl ether or dioxane or esters such as ethyl acetate may also be used. In general, a weight of catalyst at least about 20% by weight of the compound is used, although lesser or greater amounts may be found more convenient. The reaction is generally accomplished within a few hours at room temperature and at one atmosphere pressure. Higher pressures and higher temperatures may be utilized but there is no great advantage to such. The absorption of one mole of hydrogen is followed by a complete cessation or a very great decrease in the rate of hydrogen absorption. The product may be isolated simply by filtration of the catalyst and evaporation of the solvent. The alcohol may be purified or it may be converted directly to an ester or an ether as indicated above. In general, with the chemical reducing agents, the 3-α-isomer is formed. In the catalytic reduction with Raney nickel an appreciable amount of the 3-β-hydroxy compound is formed. However, the mixture of 3-α and 3-β compounds may be utilized without separation in the ensuing reactions, since the 3-alcohol is eventually oxidized to the 3-keto group. However, there is no reduction of the $C_{22}$–$C_{23}$-double bond, the retention of which is essential for subsequent steps.

The shortening of the side chain in the present synthesis, that is, the sequence of steps III to IV, IV to V and V to VI in the above diagram, may be accomplished without isolation of the individual intermediate compounds, that is, the aldehyde and the enol acetate (IV and V), if desired. That this may be accomplished without isolation of the intermediates is, of course, a very important feature of the large scale preparation of such materials where isolation of the individual intermediate products must be kept to the minimum in order to develop an economical large scale process. However, the individual compounds may be separated in solid form and purified by conventional methods, such as recrystallization from solvents.

An ester or ether of coproergosten-3-ol is dissolved in a suitable inert solvent such as a lower chlorinated hydrocarbon, e. g. methylene chloride, and an organic base such as pyridine, dimethylaniline, quinoline, etc. is added to the solution. Approximately an equal weight of the base per unit weight of the steroid may be used. A greater or lesser quantity does not detract from the reaction. The solution is then cooled below about −20° C. and preferably to about −40° C. The mixture is then treated with ozone or with air enriched in ozone until one mole of ozone or a slight excess thereof has been added to the solution. The ozonide which is formed is then subjected to reductive decomposition in order to obtain the desired carbonyl compound. In this case, 3-hydroxybisnorcholane aldehyde in the form of its 3-ester or 3-ether. A variety of mild reducing agents may be used for this purpose. These include zinc metal and a lower aliphatic acid and hydrogen in the presence of a hydrogenation catalyst such as Raney nickel in an inert organic solvent. Various other methods such as those described by Long (Chemical Reviews, vol. 27, p. 452–454 (1940)), Church et al. (J. A. C. S., vol. 56, p. 176–184 (1934)) and others may also be used for this purpose. The solvent is then removed under vacuum. The residual material may be dissolved in a water-immiscible solvent such as diethyl ether and it is treated with a lower aliphatic acid such as acetic acid and zinc metal preferably in the form of dust at a low temperature preferably about 0° C. The zinc-acetic acid combination reduces the ozonide yielding the aldehyde (IV) 3-hydroxybisnorcholane aldehyde in the form of its ester or ether. The aldehyde may be isolated by filtering the residual zinc, diluting the filtrate with a solvent, such as one of the lower chlorinated hydrocarbons and washing the solvent solution with dilute aqueous sodium bicarbonate. Upon evaporation of the solvent, the aldehyde is obtained as a white solid product.

The aldehyde obtained as described above may be converted directly to the corresponding enol by treatment with suitable acylating agents. Particularly useful is acetic anhydride which may be utilized with the addition of anhydrous sodium acetate. Other acylating agents, such as propionic anhydride, butyric anhydride, propionyl chloride, benzoyl chloride, phthaloyl chloride, phthalic anhydride, succinoyl chloride, phenylacetyl chloride, cyclohexyl-propionyl chloride, and so forth, may also be used. It is generally necessary to heat the reaction mixture for several hours to complete the conversion of the enol ester. Upon the removal of excess acylating agent, the residual material may be extracted with a lower chlorinated hydrocarbon such as methylene chloride to obtain the enol ester. Evaporation of the solvent yields this product as a solid material.

Ozonization of the enol ester and reductive decomposition of the ozonide may be accomplished under the same conditions as described above for the conversion of compound III to compound IV. The product formed by this reaction, pregnan-20-one-3-ol ester or ether is isolated in good yield and high purity. It may be recrystallized to obtain a product of higher purity having physical constants quite comparable to those reported in the literature for this product. As noted above, this keto steroid, which may be converted from the 3-ester or ether to the corresponding alcohol, is convertible to compound S by the procedure of Gallagher, Journal of the American Chemical Society, vol. 73, pages 185 and 189. Several methods have been published in the literature for the conversion of compound S to compound F including the use of biological oxygenation.

The following examples are given by way of illustration and are not to be considered as the only manner in which this invention may be embodied. It is to be understood that protection hereof is only to be limited by the specific wording of the appended claims.

*Example I.—Coproergost-22-en-3-one*

A suspension of 0.50 gram of 5% palladium-on-charcoal catalyst in 15 mls. of absolute ethanol containing 0.250 gram of potassium hydroxide was saturated with hydrogen by shaking with one atmosphere pressure of the gas. A solution of 1.00 gram of isoergosterone in 25 mls. of ethanol was added. The mixture was agitated under one atmosphere of hydrogen. In two hours 114 mls. (two moles) of hydrogen was absorbed and the hydrogen absorption then abruptly ceased. The catalyst was filtered utilizing a diatomaceous earth filteraid and the filtrate was washed with ethyl acetate. The combined filtrates were evaporated under vacuum and the residual material was dissolved in ether. After extracting the ether solution with dilute hydrochloric acid, dilute sodium bicarbonate solution and water, it was dried over anhydrous sodium sulfate. The ether was evaporated and 0.94 gram of coproergost-22-en-3-one was obtained. This material melted at 105.6 to 107.4° C. It was obtained in 93% yield. Recrystallization from an acetone-methanol mixture yielded a product which was of high purity. It melted at 108.6 to 110.2° C. Barton et al. (Journal of the Chemical Society, 1771 (1949)) reported a melting point of 110.5° C. In the method of Barton et al. a mixture of products is obtained and the present material is only formed in poor yield.

*Example II.—Coproergosten-3-α-ol*

A suspension of 1.0 gram of coproergosten-22-en-3-one in 100 mls. of ethanol was treated with 0.1 gram of sodium borohydride. The mixture was allowed to stand at room temperature for three hours, then excess reagent was destroyed with acetic acid. The ethanol solvent was removed by evaporation under vacuum and the residual material was dissolved in ether. The ether solution was washed with water, dried and then evaporated to dryness to obtain the sterol.

*Example III.—Coproergosten-3-α-ol acetate*

The product obtained by the above method was dissolved in 10 mls. of pyridine and 5 mls. of acetic anhydride. The mixture was allowed to stand at room temperature overnight. It was then concentrated under vacuum to remove excess acetylating agent. The residue was dissolved in ether and washed with water. The solvent layer was dried and then evaporated. The residual material was crystallized from ethyl acetate to obtain 0.76 gram of the acetate of coproergosten-3-α-ol. This product melted at 112° to 114° C. Its rotation was $[\alpha]_D = +15°$ C. in chloroform. Barton et al. reported a melting point of 114° to 115° C. and a rotation of $[\alpha]_D = +16°$.

Example IV.—Coproergosten-3-α-ol

Crude coproergost-22-en-3-one weighing 1.0 gram was dissolved in 30 mls. of absolute ethanol. This solution was added to a suspension of two grams of W-2 Raney nickel catalyst in 20 mls. of absolute ethanol that had previously been saturated with hydrogen. The mixture was agitated under one atmosphere of hydrogen. In one hour one mole of hydrogen had been absorbed and the hydrogen uptake stopped. The catalyst was filtered and the solution was concentrated under vacuum. In this manner, there was obtained 0.86 gram of the 3-α-ol. This product melted at 135.6°–138.4° C. It was acetylated as described above to obtain the 3-acetate which had a melting point of 110° to 114° C. after recrystallization.

Example V.—3(α)-hydroxybisnorcholane aldehyde 3-acetate

A solution of 10 grams of coproergosten-3-α-ol acetate in 250 mls. of methylene chloride was treated with 10 mls. of pyridine. The mixture was cooled and stirred vigorously at −40° C. while ozone was bubbled through the solution. The gas was added until 110% of one mole had been introduced. The mixture was then concentrated under vacuum at a low temperature. The residue was dissolved in 300 mls. of ether and 100 mls. of acetic acid and 10 grams of zinc dust were added. This mixture was stirred for one hour at 0° C. to reduce the ozonide that had been formed. The mixture was then allowed to warm to room temperature and stirred at that temperature for one-half hour. The zinc residue was filtered and the filtrate was diluted with methylene chloride. The organic solvent solution was extracted with dilute sodium bicarbonate solution and the solvent was then removed under vacuum. The aldehyde was obtained in the form of white solid weighing 9.6 grams.

Example VI.—Enol acetate of 3(α)-hydroxybisnorcholane aldehyde 3-acetate

The aldehyde product obtained as described in Example V was added to 250 mls. of acetic anhydride containing 3 grams of fused sodium acetate. The mixture was refluxed for eight hours under an atmosphere of nitrogen. The reaction mixture was then evaporated to dryness under vacuum. The residual product was triturated with several portions of methylene chloride. The solvent solutions were combined and evaporated under vacuum to obtain 8.2 grams of the desired enol acetate.

Example VII.—Pregnan-20-one-3-α-ol acetate

The enol acetate obtained as described in Example VI was dissolved in 250 mls. of methylene chloride. Ten milliliters of pyridine were added to the mixture and it was then cooled to −40° C. Ozone was bubbled through the mixture until approximately 110% of one molecular equivalent had been added. The ozonide was then converted to the ketone as described for the aldehyde in Example V above. The product was obtained in a yield of 7.1 grams. This material was of good purity. It was recrystallized from methanol to obtain 5.7 grams of very high purity product. This melted at 99° to 101° C. and had an optical rotation of $[\alpha]_D = +81.6°$. This product has been prepared by another method and the authors reported the following physical constants of melting point of 102° to 103° C.; $[\alpha]_D = +83.5°$. Reference Meystre and Miescher, Helv. Chim. Acta, vol. 29, p. 43 (1946).

What is claimed is:

1. In a process for synthesizing compound F, the steps which include: (a) contacting Δ4, 6, 22-ergostatriene-3-one with hydrogen in the presence of a noble metal catalyst and a strong base; (b) contacting the so-produced coproergost-22-en-3-one with a reducing agent capable of selectively converting a keto to a secondary alcohol group in the presence of a carbon to carbon double bond; (c) preparing a compound selected from the class consisting of coproergost-22-en-3-ol acetate, propionate, butyrate, valerate, isovalerate, caproate, caprylate, succinate, benzoate, ortho-, meta- and para-methylbenzoates, halogenated benzoates, phthalate, naphthoate, phenyl acetate, phenyl propionate, naphthoyl acetate, phenyl valerate, cyclohexyl acetate, cyclopentyl propionate and cyclohexyl propionate, and the methyl, ethyl, propyl, butyl, benzyl, phenylethyl, phenylpropyl, phenylbutyl, cyclohexylmethyl, cyclohexylethyl and methoxymethyl ethers of coproergost-22-en-3-ol by contacting the so-produced coproergost-22-en-3-ol with a reagent chosen from the group consisting of the corresponding esterifying agent and the corresponding etherifying agent; (d) contacting the so-produced compound with ozone at a low temperature; (e) reductively decomposing the resulting ozonide to produce a compound chosen from the group consisting of the corresponding 3-hydroxybisnorcholane aldehyde 3-ester and 3-hydroxybisnorcholane aldehyde 3-ether; (f) contacting the so-produced aldehyde with an enol acylating agent to produce the enol ester of said aldehyde; (g) contacting the so-produced enol ester with ozone at a low temperature; and (h) reductively decomposing the so-produced ozonide and isolating a compound chosen from the group consisting of the corresponding pregnan-20-one-3-ol 3-ether and pregnan-20-one-3-ol 3-ester.

2. A process for the preparation of coproergost-22-en-3-ol which comprises contacting coproergost-22-en-3-one in an inert organic solvent with hydrogen in the presence of a Raney nickel catalyst.

3. A process for the preparation of coproergost-22-en-3-ol which comprises contacting coproergost-22-en-3-one with sodium borohydride in an inert organic solvent.

4. A process for the preparation of a coproergosten-3-α-ol ester selected from the class consisting of the acetate, propionate, butyrate, valerate, isovalerate, caproate, caprylate, succinate, benzoate, ortho-, meta- and para-methylbenzoates, halogenated benzoates, phthalate, naphthoate, phenyl acetate, phenyl propionate, naphthoyl acetate, phenyl valerate, cyclohexyl acetate, cyclopentyl propionate and cyclohexyl propionate, which comprises contacting coproergost-22-en-3-one with sodium borohydride in a lower alcohol, recovering the so-produced carbinol and contacting said carbinol with the corresponding acylating agent.

5. In a process for the preparation of compounds selected from the group consisting of 3-hydroxybisnorcholane aldehyde 3-esters and 3-hydroxybisnorcholane aldehyde 3-ethers and enol esters of said aldehydes, the step which comprises contacting the ozonide of a compound selected from the group consisting of coproergost-22-en-3-ol 3-acetate, propionate, butyrate, valerate, isovalerate, caproate, caprylate, succinate, benzoate, ortho-, meta, and paramethylbenzoates, halogenated benzoates, phthalate, naphthoate, phenyl acetate, phenyl propionate, naphthoyl acetate, phenyl valerate, cylohexyl acetate, cycylopentyl propionate and cyclohexyl propionate, and the methyl, ethyl, propyl, butyl, benzyl, phenylethyl, phenylpropyl, phenylbutyl, cyclohexylmethyl, cyclohexylethyl and methoxymethyl ethers of coproergost-22-en-3-ol with zinc and acetic acid.

6. A process for the preparation of a compound chosen from the group consisting of a pregnan-20-one-3-ol 3-ester and a pregnan-20-one-3-ol 3-ether which comprises contacting a compound chosen from the group consisting of coproergost-22-en-3-ol acetate, propionate, butyrate, valerate, isovalerate, caproate, caprylate, succinate, benzoate, ortho-, meta- and para-methylbenzoates, halogenated benzoates, phthalate, naphthoate, phenyl acetate, phenyl propionate, naphthoyl acetate, phenyl valerate, cyclohexyl acetate, cyclopentyl propionate and cyclohexyl propionate, and the methyl, ethyl, propyl, butyl, benzyl, phenylethyl, phenylpropyl, phenylbutyl, cyclohexylmethyl, cyclohexylethyl and methoxymethyl ethers of coproergost-22-en-3-ol in an inert organic solvent containing an organic base with ozone at a temperature of less than about −20° C., decomposing the so-produced ozonide with zinc and acetic acid, contacting the so-produced aldehyde with acetic anhydride containing an anhydrous alkali metal acetate at an elevated temperature, contacting the so-produced enol acetate in an inert organic solvent containing an organic base at a temperature of less than about −20° C. with ozone, reductively decomposing the so-produced ozonide with zinc and acetic acid and isolating the so-produced compound chosen from the group consisting of the pregnan-20-one-3-ol ester and the pregnan-20-one-3-ol ether.

References Cited in the file of this patent

UNITED STATES PATENTS

| | | |
|---|---|---|
| 2,582,258 | Julian | Jan. 15, 1952 |
| 2,697,106 | Shepherd | Dec. 14, 1954 |

OTHER REFERENCES

Barton: Jour. Chem. Soc., 1949, 1771–1779.

Antonucci: Jour. Organic Chem., 16, 1453–1457 (1951).